(12) United States Patent
Chae et al.

(10) Patent No.: US 10,659,139 B2
(45) Date of Patent: May 19, 2020

(54) METHOD FOR USER EQUIPMENT (UE) TO PERFORM DEVICE-TO-DEVICE (D2D) RELAY COMMUNICATION IN WIRELESS COMMUNICATION SYSTEM AND APPARATUS THEREFOR

(71) Applicant: LG ELECTRONICS INC., Seoul (KR)

(72) Inventors: Hyukjin Chae, Seoul (KR); Byeongkook Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

(21) Appl. No.: 15/910,496

(22) Filed: Mar. 2, 2018

(65) Prior Publication Data
US 2018/0254820 A1    Sep. 6, 2018

Related U.S. Application Data

(60) Provisional application No. 62/466,353, filed on Mar. 2, 2017.

(51) Int. Cl.
| H04B 7/14 | (2006.01) |
| H04W 4/46 | (2018.01) |
| H04W 4/70 | (2018.01) |
| H04W 76/14 | (2018.01) |
| H04B 7/155 | (2006.01) |
| H04W 88/04 | (2009.01) |
| H04W 72/04 | (2009.01) |

(Continued)

(52) U.S. Cl.
CPC .......... *H04B 7/14* (2013.01); *H04B 7/15528* (2013.01); *H04W 4/46* (2018.02); *H04W 4/70* (2018.02); *H04W 76/14* (2018.02); *H04L 5/0053* (2013.01); *H04L 5/0064* (2013.01); *H04L 5/0069* (2013.01); *H04W 72/0446* (2013.01); *H04W 84/047* (2013.01); *H04W 88/04* (2013.01)

(58) Field of Classification Search
CPC ..... H04B 7/14; H04B 7/15528; H04L 5/0053; H04L 5/0064; H04L 5/0069; H04W 4/46; H04W 4/70; H04W 76/14; H04W 72/0446; H04W 84/047; H04W 88/04
See application file for complete search history.

(56) References Cited

U.S. PATENT DOCUMENTS

| 2009/0141666 A1* | 6/2009 | Jin ........................ H04B 7/2606 370/315 |
| 2015/0029866 A1* | 1/2015 | Liao ...................... H04W 4/023 370/241 |
| 2016/0285539 A1* | 9/2016 | Sadiq .................... H04W 8/005 |

(Continued)

*Primary Examiner* — Mewale A Ambaye
(74) *Attorney, Agent, or Firm* — Birch, Stewart, Kolasch & Birch, LLP

(57) ABSTRACT

A method of performing D2D (device-to-device) relay communication, which is performed by a user equipment (UE) in a wireless communication system according to various embodiments, and an apparatus are disclosed in the present invention. The method includes the steps of receiving information on a relay probability corresponding to a probability for performing relaying, receiving a message to be relayed, determining whether to perform relaying on the received message based on the information on the relay probability, and if it is determined to perform relaying, transmitting the message.

8 Claims, 12 Drawing Sheets

(51) Int. Cl.
*H04L 5/00* (2006.01)
*H04W 84/04* (2009.01)

(56) References Cited

U.S. PATENT DOCUMENTS

2018/0077668 A1* 3/2018 Chun .................... H04W 48/16
2018/0092017 A1* 3/2018 Freda ................... H04W 76/14
2018/0234942 A1* 8/2018 Kim ..................... H04W 76/10

* cited by examiner (a)

(b)

(a)

(b)

METHOD FOR USER EQUIPMENT (UE) TO PERFORM DEVICE-TO-DEVICE (D2D) RELAY COMMUNICATION IN WIRELESS COMMUNICATION SYSTEM AND APPARATUS THEREFOR

This application claims the benefit of the U.S. Patent Application No. 62/466,353, filed on Mar. 2, 2017, which is hereby incorporated by reference as if fully set forth herein.

BACKGROUND OF THE INVENTION

Field of the Invention

The present invention relates to a wireless communication system, and more particularly, to a method for a D2D UE to perform D2D relay communication in a D2D communication system and an apparatus therefor.

Discussion of the Related Art

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

SUMMARY OF THE INVENTION

Accordingly, the present invention is directed to an apparatus and method thereof that substantially obviate one or more problems due to limitations and disadvantages of the related art.

An object of the present invention is to provide a method of controlling transmit power of an uplink channel in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

A technical task of the present invention is to minimize a problem due to a half-duplex communication and form various link paths by determining whether to relay a message received by a D2D (device-to-device) UE according to a received relay probability.

To achieve these objects and other advantages and in accordance with the purpose of the invention, as embodied and broadly described herein, according to one embodiment, a method of performing D2D (device-to-device) relay communication, which is performed by a user equipment (UE) in a wireless communication system, includes the steps of receiving information on a relay probability corresponding to a probability for performing relaying, receiving a message to be relayed, determining whether to perform relaying on the received message based on the information on the relay probability, and if it is determined to perform relaying, transmitting the message.

According to the present invention, it is able to minimize shadowing or blocking by forming various link paths while a problem due to a half-duplex communication is minimized in a manner that a D2D (device-to-device) UE determines whether to relay a received message according to a received relay probability in urban non-LOS environment.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
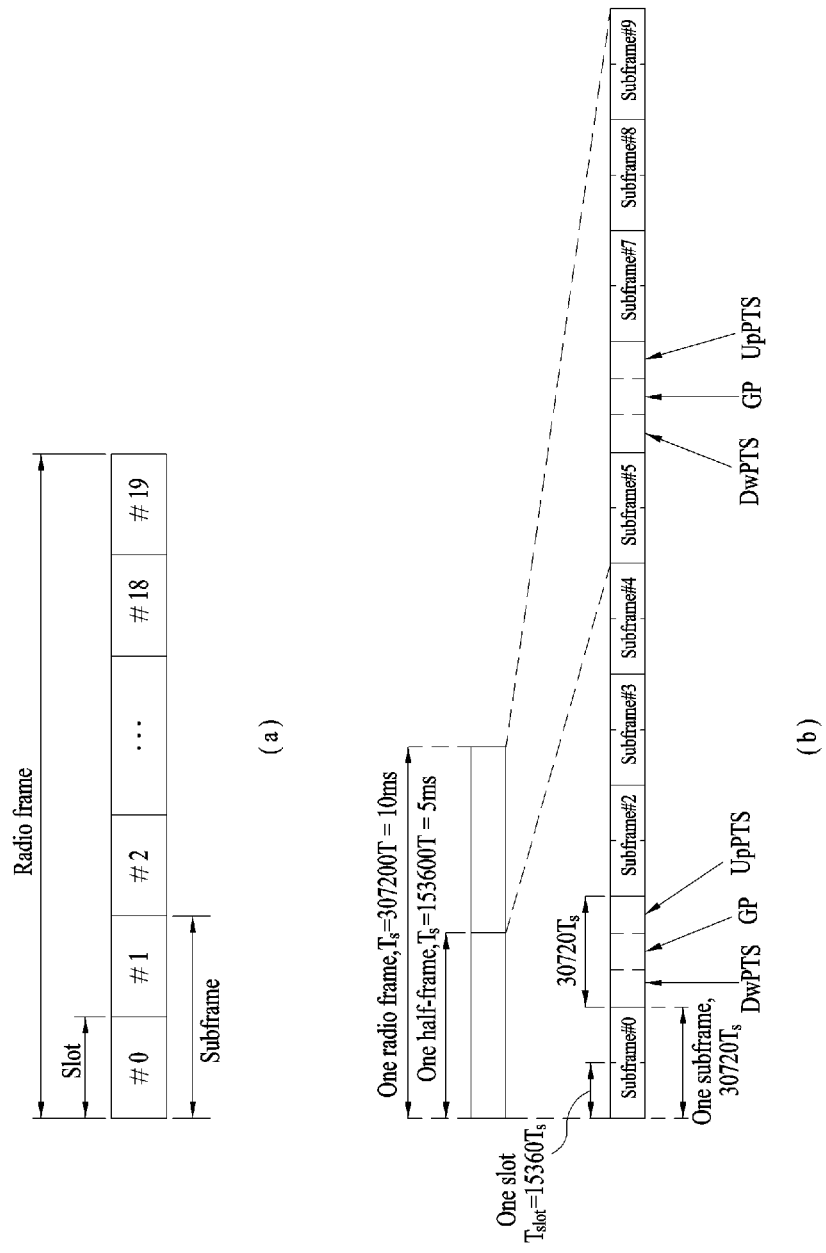
FIG. 1 is a diagram for a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'gNodeB (gNB; next Generation NodeB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
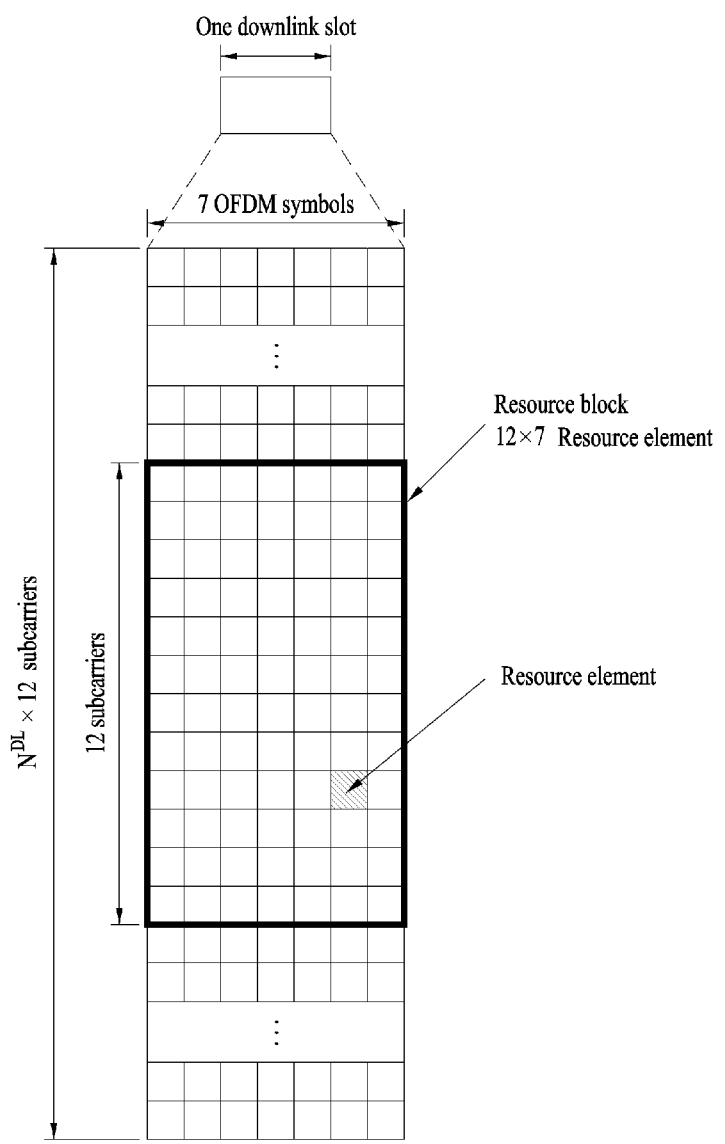
FIG. 2 is a diagram for a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
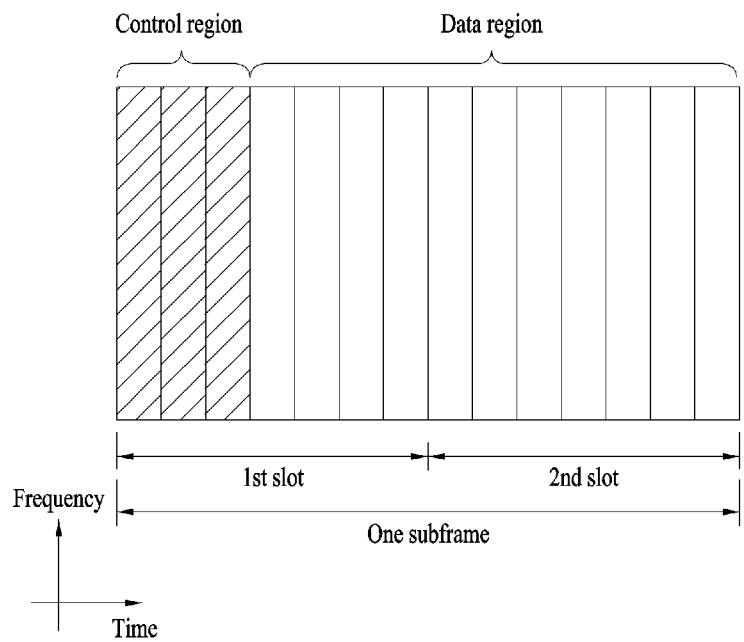
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
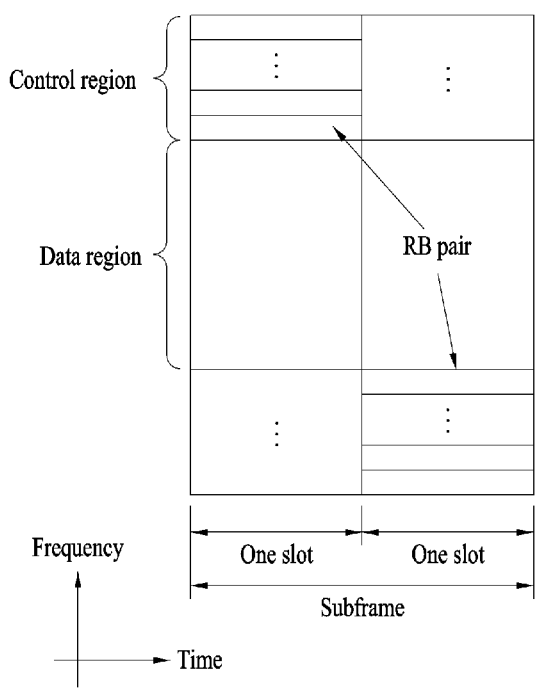
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

Figure 5:
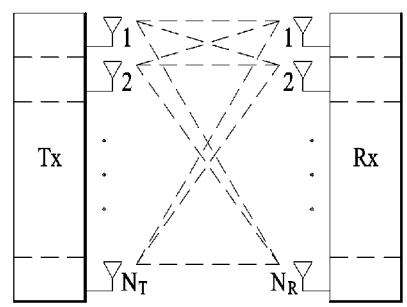
FIG. 5 is a diagram for a configuration of a wireless communication system having multiple antennas.
Figure 5:
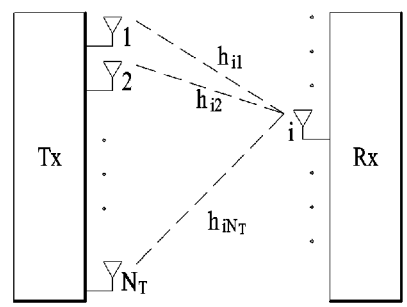

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an ith transmit antenna and jth information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \quad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$ [Equation 8]

An AWGN (Additive White Gaussian Noise) is added to the actual channels after a channel matrix H. The AWGN $n_1$, $n_2$, ..., $n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
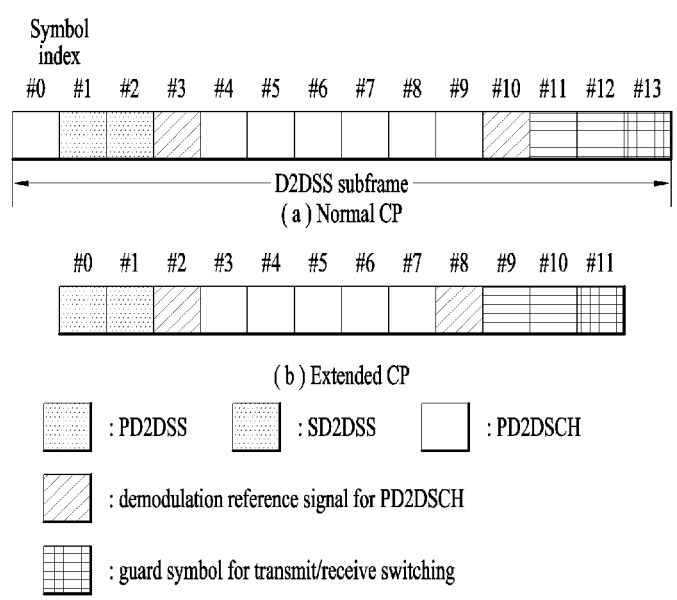
FIG. 6 is a diagram for a subframe in which a D2D synchronization signal is transmitted.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
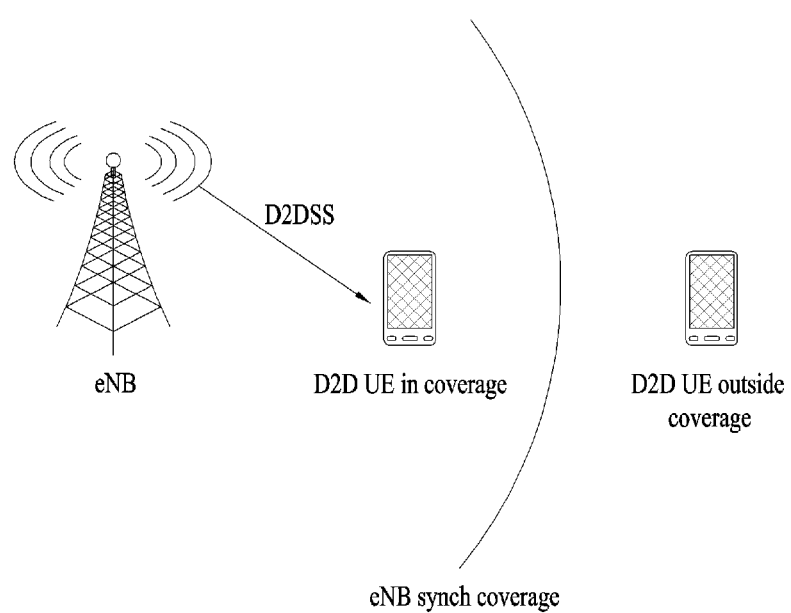
FIG. 7 is a diagram for explaining relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 8:
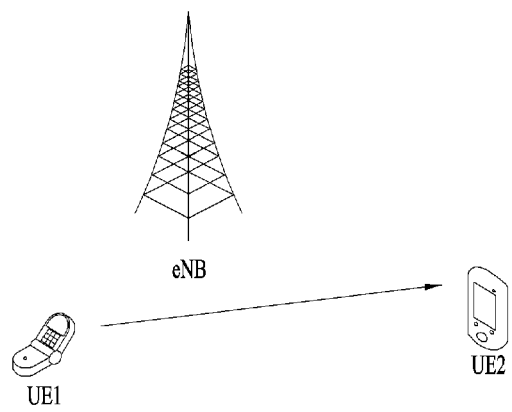
FIG. 8 is a diagram for an example of a D2D resource pool for performing D2D communication.
Figure 8:
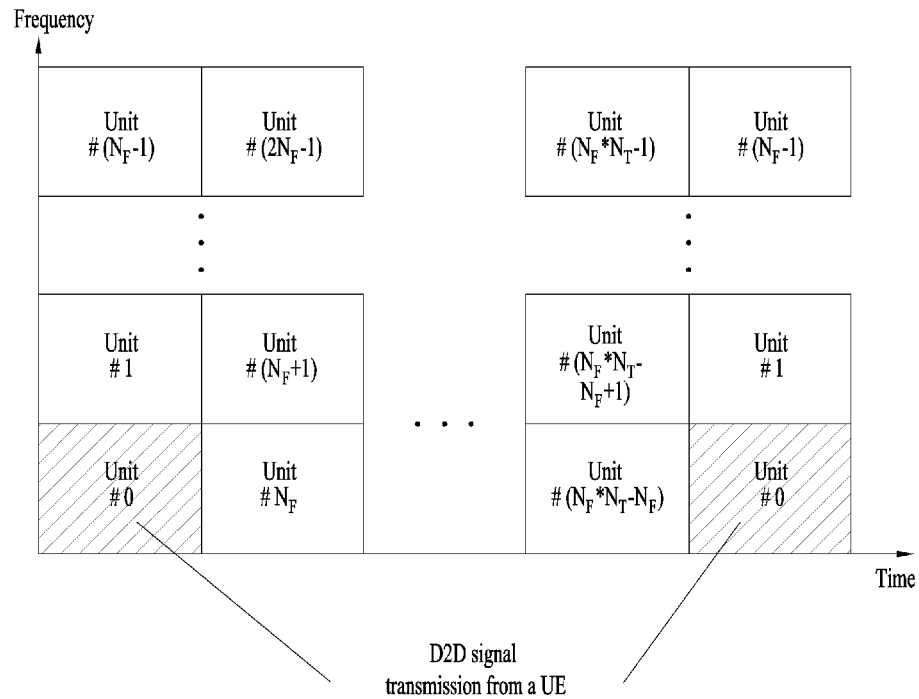

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the NF number of resource units and the entire time resources are divided into the NT number of resource units. In particular, it is able to define NF*NT number of resource units in total. In particular, a resource pool can be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
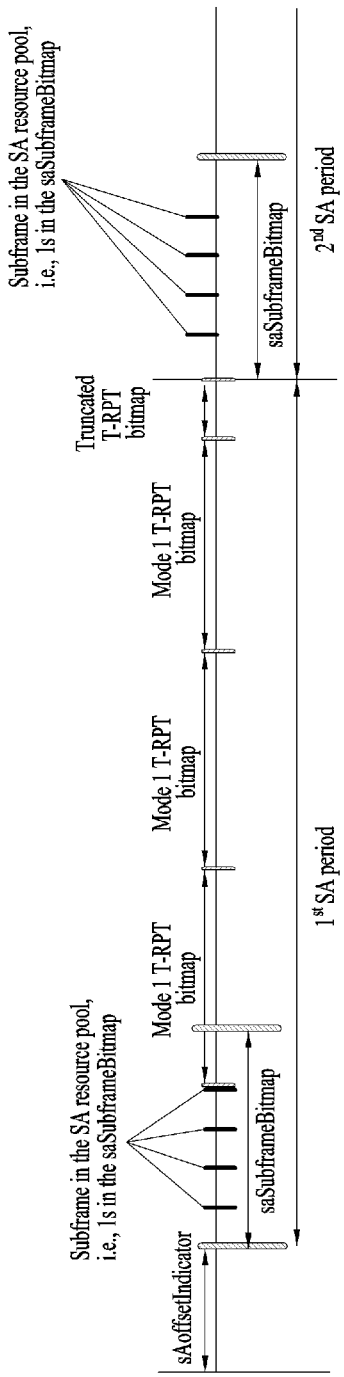
FIG. 9 is a diagram for explaining an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

Figure 10:
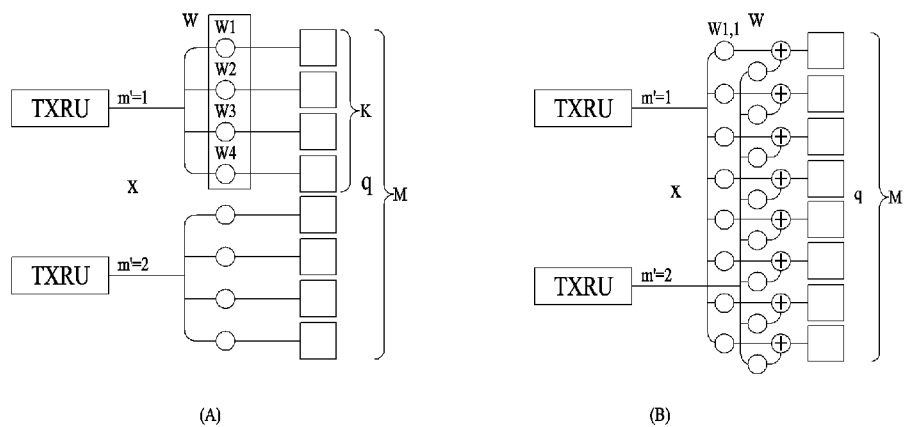
FIG. 10 illustrates examples of a connection scheme between TXRUs and antenna elements.

FIG. 10 illustrates examples of a connection scheme between TXRUs and antenna elements.

(a) of FIG. 10 illustrates that TXRU is connected to a sub-array. In this case, the antenna elements are connected to only one TXRU. Unlike (a) of FIG. 10, (b) of FIG. 10 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to- or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 11:
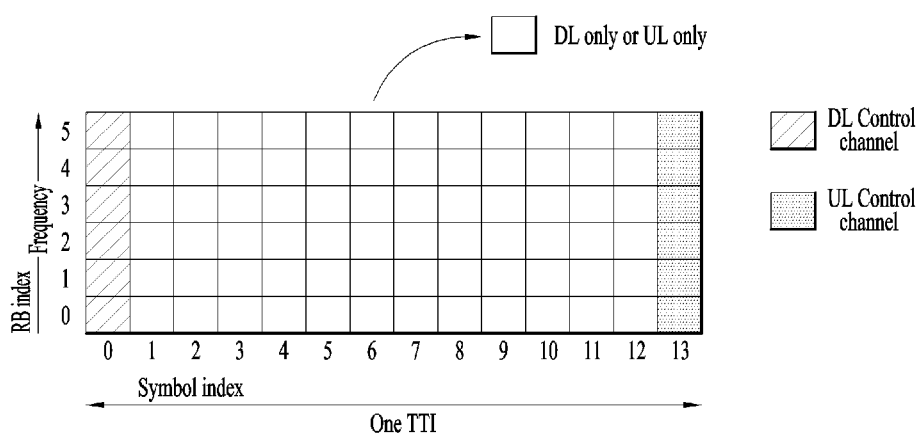
FIG. 11 illustrates an example of a self-contained subframe structure.

A self-contained subframe structure shown in FIG. 11 is considered in the fifth generation NewRAT to minimize data transmission latency in a TDD system. FIG. 11 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period Meanwhile, the status that sharp beamforming (for example, analog beamforming) for DL/UL is introduced using a plurality of antennas may be considered in the fifth generation NewRAT. In this case, it may be assumed that sharp beamforming is varied depending on time.

In the $5^{th}$ generation NewRAT, a scheme of transmitting a signal may vary depending on a service or a requirement. For example, eMBB (enhanced Mobile BroadBand) may have a relatively long transmission time unit and URLLC (Ultra-Reliable and Low Latency Communications) may have a relatively short transmission time unit.

In case of the URLLC, a ULRRC signal can be transmitted in a corresponding resource in the middle of transmitting the eMBB according to a type of a service (i.e., an emergency service). Hence, a network or a UE may consider preempting a partial transmission resource of the eMBB for URLLC transmission.

In this case, due to the preemption, a part of transmission resources of the eMBB having a relatively long transmission time unit can be punctured. Or, a (super-imposed) signal can be deformed in a manner of being overlapped with a different signal such as URLLC.

If the URLLC transmission preempts a partial resource of the eMBB transmission, it is highly probable that a UE fails to perform decoding on a specific code block (CB) of the eMBB transmission. In particular, although a channel state is good, the abovementioned situation may lead to a decoding failure for a specific code block. Hence, when retransmission is performed in the $5^{th}$ generation NewRAT, it may consider performing the retransmission in a unit of a code block rather than a unit of a transport block (TB).

<A Robust Broadcasting Scheme>

The present invention proposes a method for enhancing reception performance in non-LOS (non-line of sight) environment such as a shadow area in urban environment via cooperation between UEs. It is necessary for a UE to periodically forward a message to all UEs belonging to a specific target range within a prescribed period. For example, in V2V (vehicle to vehicle) communication, it is necessary to forward a CAM (cooperative awareness message) to all UEs within 150 m with a period of 100 msec in urban non-LOS environment.

Performance in the urban non-LOS environment such as a crossing in a downtown depends greatly on long-term fading such as shadowing or blocking. A D2D system uses a diversity scheme in time/frequency space to increase performance of a link. In particular, the D2D system performs repetitive transmission several times in a different time/frequency resource to secure performance of a link. However, although a time/frequency resource is changed in shadowing or blocking environment, performance of a link is not secured. In order to solve the problem, it is necessary for the D2D system to prevent the occurrence of the shadowing or the blocking by changing a delivery path of a signal. The present invention proposes a method of overcoming shadowing or blocking and securing performance of a link via cooperation between UEs.

According to one embodiment of the present invention, a UE performs repetitive transmission to enhance performance of a link. And, neighboring UEs perform a relay function of a decode-and-forward scheme based on a probability. For example, each UE performs repetitive transmission N times within a specific period. When transmission is performed N−1 times except a first transmission or transmission is performed N−M times except the first M number of transmissions, if UEs are successfully receive a message in receiving a packet one time or M times (e.g., CRC pass in receiving a packet one time or M times), the UEs operate as a relay to secure performance of a link. According to the present invention, it may be able to minimize shadowing or blocking by securing multipath diversity via a relay.

In this case, each UE can be connected with a network (or, a base station) via a control channel for controlling. The control channel can share the same frequency resource with a message (e.g., CAM) to be broadcasted or may use a different frequency resource. In particular, 5.9 GHz band is used for broadcasting a message and 2.0 GHz band can be used for transmitting a control signal. If necessary, each UE receives a control signal (or, probability) from the network or feedbacks status information (or, the number of UEs which have properly received a signal) through the control channel. The network (or, the base station) calculates a relay probability based on the feedback information and can deliver the calculated relay probability to each UE.

Specifically, a message (e.g., CAM) broadcasted by a UE can be configured by a component of two types including SA (scheduling assignment) and data. The SA can include control information of data including a time frequency resource position of data, MCS (modulation coding scheme), hopping, repetitive transmission pattern, location, and the like. The data includes contents of a message to be broadcasted.

First of all, a reception UE receives the SA. If data indicated by the received SA corresponds to an interested data (i.e., data necessary to be received), the reception UE receives the data. If repetitive transmission including initial data is performed N times within a single period, two configurations described in the following are available.

First of all, a broadcasted message including SA and data can be transmitted N times. In this case, all control information of data transmitted N times can be transmitted in a manner of being included in each SA or piggybacked to data.

Or, transmissions repeated N times can be configured by SA transmitted one time and data transmitted N times. In this case, all control information of data is included in one SA. If a UE receives the SA or an $i^{th}$ (i=1, 2, ..., N−1) data, the UE is able to know content and configuration information of data appearing after the $i^{th}$ data. Hence, the UE is able to generate the data appearing after the $i^{th}$ data. If the UE transmits the data to a corresponding position, it may be able to obtain a diversity effect. (Relaying based on decode-and-forward scheme)

In this case, a half-duplex problem may occur. Hence, it is necessary consider the half-duplex problem. If the half-duplex problem occurs, a UE is unable to perform transmission and reception at the same time. In case of D2D-based V2X, a plurality of resources can be multiplexed in a form of FDM (frequency division multiplexing) in a time unit (subframe). In this case, if a UE transmits one of a plurality of resources while playing a role of a relay, the UE is unable to receive all resources of a corresponding subframe. Consequently, as a UE operates as a relay more and more, reception performance of the UE is degrading due to the half-duplex problem. (In this case, the reception performance denotes a ratio of the number of reception UEs within a target range to the total number of UEs).

In order to efficiently reduce the half-duplex problem and increase reception performance, the present invention proposes two methods described in the following.

When repetitive transmission is performed, whether or not a UE plays a role of a relay can be controlled by a probability (Method 1). In particular, according to the aforementioned description, when a UE receives $i^{th}$ data, the UE may not play a role of a relay in transmitting data appearing after the $i^{th}$ data. In particular, when the UE receives the $i^{th}$ data, the UE can determine whether to perform relaying with a prescribed probability (p). In general, as density (number of UEs per unit area) of UEs is smaller, performance deterioration is getting worse not by a resource collision but by shadowing, and the like. In this case, since the number of resources in use is less, although a probability (p) of a relay is increased, the half-duplex problem is not considerably increased. On the other hand, since link performance is secured due to a multipath diversity effect, overall performance can be enhanced.

Meanwhile, when a UE performs relaying with a probability of p, if the number of transmission UEs within a single period corresponds to N, the UE performs relaying N*p times in average. In this case, as a worst case, a UE participating in relaying more than N*p time may fail to receive packets as many as a transmission count due to the half-duplex problem. In particular, if a subframe in which a message of a relaying UE is transmitted is not overlapped with a subframe in which relaying is performed, the number of Rx subframes is reduced, thereby deteriorating reception performance. In particular, according to the method 1, since transmission resources of UEs performing relaying are not aligned, reception performance is degraded. When a relay probability is given by p, a method (method 2) of minimizing the half-duplex problem is proposed in the following.

Figure 12:
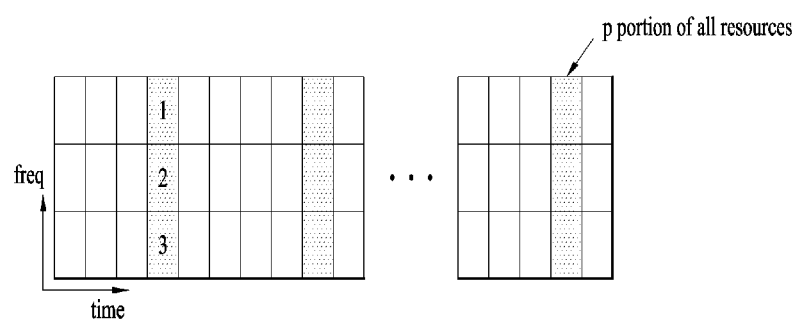
FIG. 12 is a diagram for explaining a subframe in which a relay message is to be transmitted according to one embodiment of the present invention.

FIG. 12 illustrates resources within a single period. Each of UEs selects a subframe (shadowed part in FIG. 12) in which relaying is to be performed from among subframes. The subframe in which relaying is to be performed can be selected by a first Tx UE or a UE performing relaying. Or, a relaying resource, which is necessary for performing relaying, common to a Tx UE and an Rx UE can be configured in advance. If a relaying resource common to a Tx UE and an Rx UE is configured in a specific resource pool, a UE performing relaying among UEs performs retransmission in a subframe configured for relaying using a part of packets successfully received prior to the subframe. If a relaying resource is configured by a first Tx UE, a UE participating in relaying performs retransmission in an SFN (signal frequency network) manner in the resource configured by the first Tx UE. Here, the SFN mode is a method by which a plurality of terminals transmits the same signal at the same time frequency resource, thereby allowing the receiving terminal to effectively receive a signal of a large energy. It can be mainly used for broadcasting signal transmission. That is, the terminal does not use the additional subframe for the relay but also transmits the message for performing the relay at the time of transmitting the specific data, so that the terminal does not cause half-duplex communication problem.

Unlikely, if a resource is configured by a UE performing relaying, similar to the method 1, reception performance of the UE participating in relaying can be degraded due to the half-duplex problem. In order to solve the problem, the relaying UE can transmit a packet to be relayed together when the relaying UE transmits a message.

Specifically, in FIG. 12, if a colored part corresponds to a subframe in which relaying is performed by a reception UE, the subframe may correspond to a subframe in which a message of a relaying UE is transmitted. For example, if the relaying UE transmits a message of the relaying UE on a subchannel 1, the relaying UE can transmit a packet to be relayed on a subchannel 2 or 3.

Meanwhile, in the aforementioned methods, if a UE participating in relaying selects a relaying resource or a relaying resource is configured in advance, a reception UE may be unaware of whether a packet transmitted in the relaying resource corresponds to a packet for retransmission or not. In other word, it is difficult for the reception UE to know whether a packet included in the relaying resource corresponds to a packet used for a message of the UE participating in relaying or a packet to be relayed. Hence, information on whether a packet is used for retransmission of a certain packet or retransmission of a message of a certain UE can be signaled through a communication control signal between UEs.

When a UE relays a plurality of messages in a subframe or transmits a message of the UE and a message (or, a packet) to be relayed at the same time, it may become multi-cluster transmission. If SC-FDMA is used as a transmission scheme, it is necessary to perform spreading (or, precoding) on each of the messages using DFT and perform IFFT. In this case, since PAPR (peak-to-average power ratio) can be greater than that of a legacy 1 cluster scheme. Hence, it is necessary to perform power backoff. In consideration of a size of a CAM message corresponding to a target application in V2X and MCS are considered, the number of CAMs in a subframe may correspond to maximum 3. In this case, it is necessary to perform power backoff as much as about 2 dB in consideration of PAPR. In particular, when maximum transmit power corresponds to 23 dBm, it is necessary to perform multi-cluster transmission using transmit power of 21 dBm. Yet, since cooperative transmission is performed by a plurality of relay UEs, performance deterioration due to the power backoff may be insignificant.

However, if PAPR is a big problem in some cases, relaying may not improve performance. In consideration of this point, the number of the messages performing the maximum simultaneous transmittable relay or the transmission parameters such as the RB size can be predetermined or signaled to the physical layer or the higher layer signal by the network. Alternatively, the transmission parameters may be determined by an implementation of the UE.

A relay UE can be selected in various ways. As mentioned in the foregoing description, when repetitive transmission is performed, a relaying UE can be stochastically selected from among UEs which have successfully received a first message (first selection method). A UE near (within X meter) a crossing (or specific geographic location) can be selected as a relaying UE from among UEs which have successfully received a first message (second selection method). Or, a UE away from a source more than a certain distance can be selected as a relaying UE from among UEs which have successfully received a first message (third selection method). A relaying UE can be selected by duplicately applying at least two or more methods from among the first, the second and the third selection method. For the first selection method, the network signalizes the probability information for determining whether the UEs are relayed to the physical layer or the upper layer signal, or the UEs outside the network (or eNB) coverage may have the predetermined value of probability determined in advance. For the second selection method, the network (or the base station) can signal the UE to the physical layer or the higher layer signal for geographical information that is mainly required for relaying. After receiving the geographical information, the UE may be prescribed to perform relaying if it is located in the corresponding area. Or the information about the geographical position in the second selection method may be derived from the fixed node of the corresponding location. For example, a fixed station (eNB or RSU (roadside unit)) is installed at a position where relaying is required, and the fixed station can signal to the UE indication information to explicitly perform relaying. Alternatively, a UE received over a specific strength based on the reception strength of a reference signal from a fixed station (or a base station) installed at a specific location may be set as a candidate UE capable of performing relaying. For this purpose, the network (or the base station) can signal to the UE, by the physical layer or the higher layer signal, information about which relay to perform when receiving the reference signal of a certain fixed station. For the third selection method, only the UEs whose reference signal strength from the source UE is within a certain range can perform the relay. In this case, the condition for the reference signal strength may be signaled to the physical layer or higher layer signal by the network (or the base station), this condition may be signaled by the Tx UE, or this condition may be predetermined.

A relay probability (p) can be determined by one of two methods described in the following.

First of all, a network (or, a base station) or UE calculate density of Nearby UEs and broadcasts a relay probability (p) corresponding to the density. To this end, a separate control channel for controlling may separately exist between the network and the UEs. When a side-effect such as half-duplex is considered, an optimized p value is closely associated with the density of the UE. In general, an optimized p value exists according to the density of the UEs. In other word, the network (or, the base station) can determine an optimized relay probability (p) for minimizing a side effect such as half-duplex based on the density of the UEs. The optimized relay probability (p) can be determined by a table pre-calculated through simulation and the like. The network (or, the base station) searches for the optimized p value from the table according to the density of the UEs and can forward the optimized p value to the UEs via a control channel or the like (method 1).

Or, the network (or, the base station) receives minimum information from a UE and can perform a method of applying a relay probability (p) (method 2). Alternatively, the UE may determine the relay probability by measuring the number or density of the neighboring UEs themselves (method 3). For this, the UE can measure the channel busy ratio (CBR). Here, CBR is a ratio of resources used by other UEs in a specific resource area for a predetermined time. The network (or the base station) may signal the probability range of performing the relay according to the CBR measured by the UE to the physical layer or the higher layer signal in advance.

Figure 13:
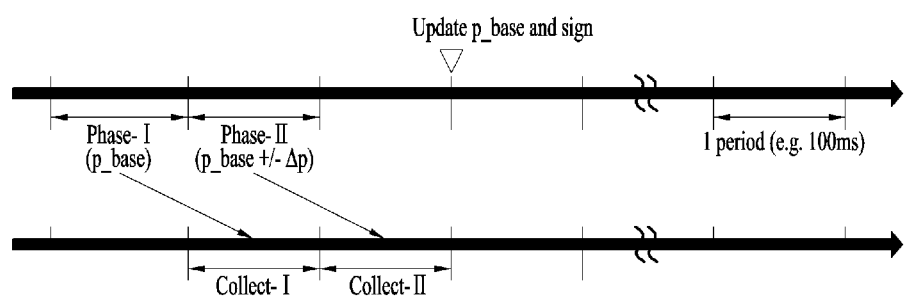
FIG. 13 is a diagram for explaining a method of determining a relay probability according to one embodiment of the present invention.

Referring to FIG. 13, the method 2 or method 3 can be configured by 3 phases. In a first phase, a feedback UE is determined. If all UEs perform feedback, feedback overhead increases. Hence, a feedback UE can be determined according to a predetermined probability among a plurality of UEs. For example, each of UEs determines whether to perform feedback using a probability of 10%. The determined feedback UE is maintained until a cycle consisting of 3 phases ends. In the first phase, a relay probability (p1) is configured by an initial probability (p_base) and the number (N1) of UEs, which have successfully performed reception, can be fed back to the network. In this case, as mentioned in the foregoing description, feedback is performed not by all UEs but by the determined feedback UE only.

In a second phase, $p\_base+\Delta p$ is configured as a relay probability (p) to operate the feedback UE. For example, if an initial probability is quantized, a value of a next relay probability can be selected as a relay probability value in the second phase. In this case, only the feedback UE feeds back the number (N2) of UEs, which have successfully performed reception, to the network. In other word, the network (or, the base station) receives feedback from a feedback UE, which have successfully received a specific relay packet (or, a message), and can determine the number of UEs which have successfully received the relay packet (or, the message) in each phase. If a change of topology is not that big in the first phase and the second phase, it may be able to determine a better relay probability value by comparing the numbers of UEs, which have successfully performed reception, with each other. In the third phase (Phase 3), a process corresponding to the second phase can be performed. For example, in the third phase (Phase 3), a value of the relay probability obtained by adding a predetermined adjustment value to the relay probability value in the second phase (Phase 2) can be set as the relay probability. In this case, the network (or base station) or the UE may receive feedback from a feedback UE that has successfully received a particular relay packet (or message). In this case, the network or the UE can determine the number of UEs that have successfully received the relay packet (or message) in the third phase.

It may be able to increase accuracy of determination by accumulating the values. In particular, whenever N2>N1 is satisfied, the network (or, the base station) increases a confidence counter (CC) value by 1. If N2<N1 is satisfied, the CC is decreased by 1. If the CC is equal to or greater than a specific threshold value, p_base of a next period can be updated to $p\_base+\Delta p$.

If the CC becomes 0, the network (or, the base station) may apply p_base−Δp in the phase 2 by changing a sign of the change value. If the CC is equal to or greater than a specific threshold value, p_base of a next period can be updated to p_base−Δp.

Hence, whenever a cycle consisting of the first, the second, and the third phase ends, it is necessary for the network to broadcast information on the p_base and a sign of the Δp. It is able to obtain an optimized p value via the abovementioned adaptation procedure.

According to one embodiment, a UE capable of performing relay communication can receive information on a relay probability when relaying is performed. If the UE receives a message necessary to be relayed, the UE can determine whether to relay the message based on the relay probability. For example, when the relay probability corresponds to 10% and the message is received 10 times, the UE is able to perform relaying on the message one time.

The relay probability can be determined by a base station in advance. The base station identifies the number of D2D UEs per unit area (density of D2D UEs) and can determine a relay probability in response to the identified density of the D2D UEs. Specifically, the base station may have a table for the relay probability corresponding to the density of the D2D UEs and can determine the relay probability corresponding to the density of the D2D UEs based on the stored table.

Or, the base station may change a predetermined probability based on feedback information provided by neighboring UEs. Specifically, the base station can determine UEs of a predetermined probability as feedback UEs among the neighboring UEs. In this case, the base station broadcasts information on the relay probability according to the table to the neighboring UEs. The base station can identify the number of UEs, which have successfully received a prescribed signal from the determined UE, by increasing or decreasing the relay probability as much as a predetermined value. The base station is able to detect an optimized relay probability by repeating the abovementioned procedure and may change the relay probability according to the table with the detected optimized relay probability. The base station can broadcast information on the changed optimized relay probability to neighboring UEs.

According to one embodiment, a UE can determine whether to perform relaying on the message by further considering a distance from a UE which has transmitted the message. For example, the UE can measure a distance from the UE, which have transmitted the message, based on location information of the UE, which has transmitted the message. If the distance is less than a predetermined distance, the UE may not perform relaying although relaying is determined to be performed on the message according to the relay probability. Or, the UE can determine whether to perform relaying on the message in further consideration of surrounding (e.g., importance of surrounding obstacle such as crossing, open field, highway, etc.).

A subframe in which the received message (or, a packet) is to be relayed can be configured by the UE, which has transmitted the message, in advance. In this case, if it is determined to perform relaying on the received message, the UE can transmit the message in the predetermined subframe.

Or, if there is a subframe in which a message of a UE is to be transmitted, the UE can transmit a message to be relayed together with the message of the UE in the subframe. In this case, in order to solve a problem according to multi-cluster transmission, the UE can back-off transmit power of the subframe.

Figure 14:
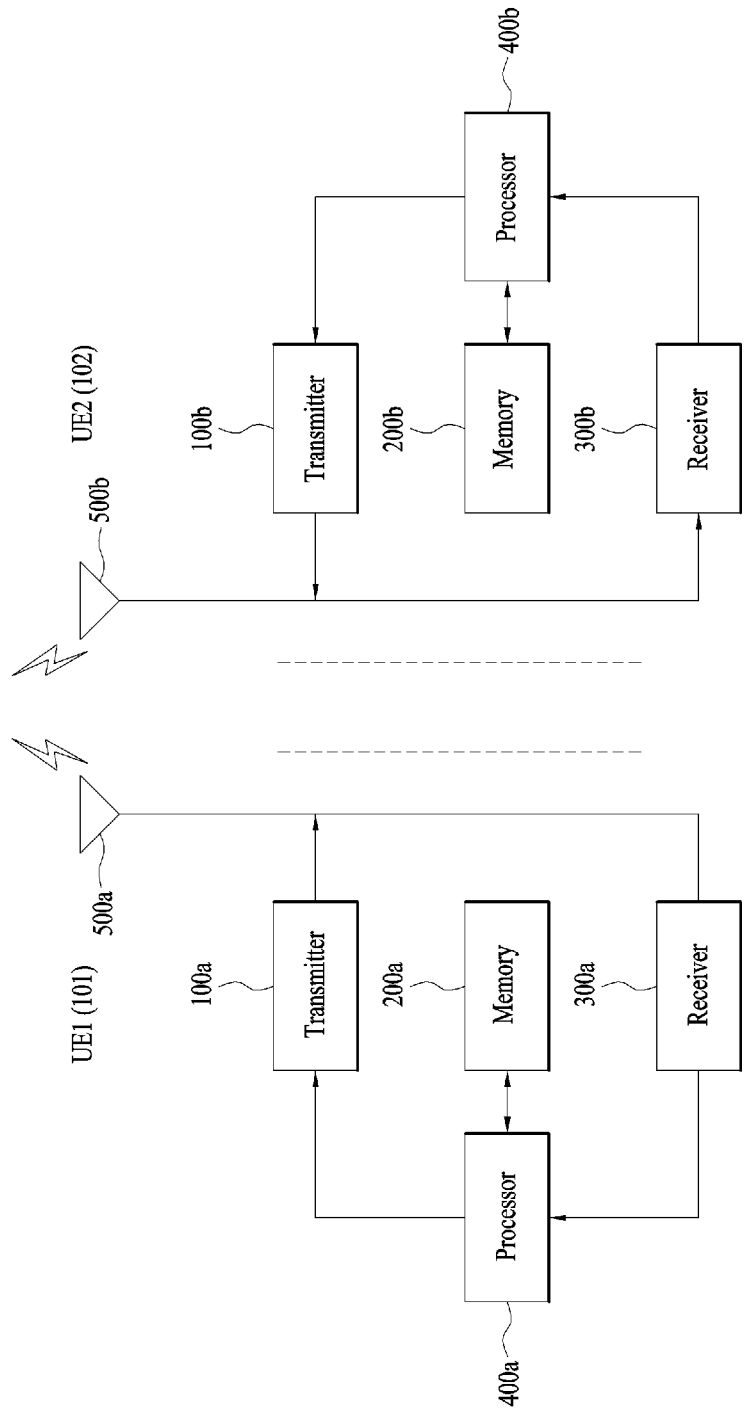
FIG. 14 is a diagram for configurations of a transmitter and a receiver.

FIG. 14 is a diagram for configurations of a transmitter and a receiver.

Referring to FIG. 14, a transmit point apparatus 101 may include a receiver 300a, a transmitter 100a, a processor 400a, a memory 200a, and a plurality of antennas 500a. The antennas 500a represent the transmit point apparatus that supports MIMO transmission and reception. The receiver 300a may receive various signals, data and information from a UE on an uplink. The transmitter 100a may transmit various signals, data and information to a UE on a downlink. The processor 400a may control overall operation of the transmit point apparatus 101.

The processor 400a of the transmit point apparatus 101 according to one embodiment of the present invention may perform processes necessary for the embodiments described above.

Additionally, the processor 400a of the transmit point apparatus 101 may function to operationally process information received by the transmit point apparatus 101 or information to be transmitted from the transmit point apparatus 101, and the memory 200a, which may be replaced with an element such as a buffer (not shown), may store the processed information for a predetermined time.

Referring to FIG. 14, a UE 102 may include a receiver 300b, a transmitter 100b, a processor 400b, a memory 200b, and a plurality of antennas 500b. The antennas 500b represent the UE that supports MIMO transmission and reception. The receiver 300b may receive various signals, data and information from an eNB on a downlink. The transmitter 100b may transmit various signals, data and information to an eNB on an uplink. The processor 400b may control overall operation of the UE 102.

The processor 400b of the UE 102 according to one embodiment of the present invention may perform processes necessary for the embodiments described above.

Additionally, the processor 400b of the UE 102 may function to operationally process information received by the UE 102 or information to be transmitted from the UE 102, and the memory 200b, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 101 in FIG. 14 may be equally applied to a relay as a downlink transmitter or an uplink receiver, and description of the UE 102 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of performing device-to-device (D2D) relay communication, which is performed by a user equipment (UE) in a wireless communication system, the method comprising:
    receiving information on a relay probability corresponding to a probability for performing relaying from a base station;
    selecting a first subframe for a relay among a plurality of subframes included in a preconfigured resource pool based on the relay probability;
    receiving a first message to be relayed; and
    relaying the first message in at least one subframe included in the first subframe,
    wherein the at least one subframe corresponds to a subframe in which a second message of the UE is transmitted, and
    wherein a ratio of the selected first subframe to the plurality of subframes corresponds to the relay probability.

2. The method of claim 1, wherein the relay probability corresponds to a probability predetermined by the base station based on a density of D2D UEs within a predetermined range from the base station.

3. The method of claim 1, wherein if a density of D2D UEs within a predetermined range from the base station decreases, the relay probability increases.

4. The method of claim 1, further comprising:
    determining whether to feedback information on the reception of the first message to the base station based on a predetermined probability; and
    feeding back the information on the reception of the first message to the base station in response to a result of the determination.

5. The method of claim 4, wherein the relay probability is changed by the base station based on a density of D2D UEs within a predetermined range from the base station and the information on the reception of the first message.

6. The method of claim 1, wherein the UE determines whether to perform relaying on the received first message in further consideration of a distance from a UE which has transmitted the first message.

7. The method of claim 1, wherein the message corresponds to a cooperative awareness message (CAM) for vehicle to vehicle (V2V) communication.

8. A user equipment (UE) performing device-to-device (D2D) relay communication in a wireless communication system, the UE comprising:
    a transceiver; and
    a processor configured to control the transceiver,
    wherein the processor is configured to:
    receive information on a relay probability corresponding to a probability for performing relaying,
    select a first subframe for a relay among a plurality of subframes included in a preconfigured resource pool based on the relay probability,
    receive a first message to be relayed, and
    relay the first message in at least one subframe included in the first subframe,
    wherein the at least one subframe corresponds to a subframe in which a second message of the UE is transmitted, and
    wherein a ratio of the selected first subframe to the plurality of subframes corresponds to the relay probability.

* * * * *